United States Patent
Chen

(10) Patent No.: US 9,611,925 B2
(45) Date of Patent: Apr. 4, 2017

(54) TORQUE CONVERTER HAVING A REACTOR CONTROLLED BY A JAW CLUTCH

(71) Applicant: Zhongtai Chen, West Bloomfield, MI (US)

(72) Inventor: Zhongtai Chen, West Bloomfield, MI (US)

( * ) Notice: Subject to any disclaimer, the term of this patent is extended or adjusted under 35 U.S.C. 154(b) by 64 days.

(21) Appl. No.: 14/620,982

(22) Filed: Feb. 12, 2015

(65) Prior Publication Data

US 2016/0238116 A1 Aug. 18, 2016

(51) Int. Cl.
*F16H 45/02* (2006.01)
*F16D 11/14* (2006.01)
*F16D 25/061* (2006.01)

(52) U.S. Cl.
CPC .............. *F16H 45/02* (2013.01); *F16D 11/14* (2013.01); *F16D 25/061* (2013.01)

(58) Field of Classification Search
CPC .. F16H 45/02; F16H 45/00; F16H 2045/0205; F16D 11/00; F16D 25/061
See application file for complete search history.

(56) References Cited

U.S. PATENT DOCUMENTS

| | | | | |
|---|---|---|---|---|
| 1,475,265 A | * | 11/1923 | Hoffman | F16H 61/0293 74/336.5 |
| 1,502,953 A | * | 7/1924 | Hoffman | F16H 61/0293 74/336.5 |
| 1,539,188 A | * | 5/1925 | Hoffman | F16H 61/0293 74/336.5 |
| 1,613,525 A | * | 1/1927 | Horner | F16H 39/20 60/412 |
| 1,613,535 A | * | 1/1927 | Root | A63B 25/00 482/75 |
| 1,754,893 A | * | 4/1930 | Hurlburt | F16H 3/722 475/105 |
| 1,855,967 A | * | 4/1932 | Jandasek | F16H 61/60 192/3.24 |
| 1,877,796 A | * | 9/1932 | Bossart | F16H 47/12 192/58.3 |
| 1,993,741 A | * | 3/1935 | Jandasek | F16H 61/56 192/3.22 |
| 2,611,452 A | * | 9/1952 | Lapsley | F16H 61/58 188/82.6 |
| 2,727,606 A | * | 12/1955 | Lapsley | F16D 23/02 192/3.26 |

(Continued)

FOREIGN PATENT DOCUMENTS

JP 2006300099 A * 11/2006

OTHER PUBLICATIONS

Hydrodynamic Drives Terminology, Jun. 2012, SAE International, SAE J641.*

*Primary Examiner* — Jacob S Scott
*Assistant Examiner* — Lori Wu
(74) *Attorney, Agent, or Firm* — Thomas P. Heed

(57) ABSTRACT

A torque converter in which the standard one-way clutch, otherwise known as an overrunning brake, on the reactor, otherwise known as a stator, is replaced with a jaw clutch. When the jaw clutch is engaged, the reactor is non-rotate. When the jaw clutch is disengaged, the reactor spins freely. The jaw clutch can be placed on the same hydraulic fluid circuit as a bypass clutch.

5 Claims, 2 Drawing Sheets

(56) References Cited

U.S. PATENT DOCUMENTS

| | | | | |
|---|---|---|---|---|
| 4,128,999 A | * | 12/1978 | Yokoyama | F16H 45/02 192/3.3 |
| 4,969,543 A | * | 11/1990 | Macdonald | F16H 45/02 192/113.36 |
| 5,474,506 A | * | 12/1995 | Palansky | F16H 61/143 477/176 |
| 5,509,520 A | * | 4/1996 | Evans | F16H 61/143 192/221 |
| 5,586,434 A | * | 12/1996 | Okubo | F16D 41/064 60/345 |
| 5,613,581 A | * | 3/1997 | Fonkalsrud | F16D 48/066 192/219 |
| 5,674,153 A | * | 10/1997 | Jang | F16H 61/0206 477/116 |
| 5,852,932 A | * | 12/1998 | Matsumoto | F16D 41/22 192/46 |
| 5,947,242 A | * | 9/1999 | Creger | F16H 45/00 192/221 |
| 5,975,260 A | * | 11/1999 | Fischer | F16H 45/02 192/107 R |
| 6,019,202 A | * | 2/2000 | Anwar | B60W 10/02 192/13 R |
| 6,050,375 A | * | 4/2000 | Gradu | F16H 61/60 192/3.22 |
| 6,247,568 B1 | * | 6/2001 | Takashima | F16H 45/02 192/113.36 |
| 6,742,638 B2 | * | 6/2004 | Maienschein | F16H 45/02 192/113.36 |
| 6,959,544 B2 | * | 11/2005 | Fukunaga | F16H 41/26 60/330 |
| 7,357,233 B2 | * | 4/2008 | Kos | F16H 45/02 192/107 R |
| 7,454,902 B2 | * | 11/2008 | Fukunaga | F16H 41/26 60/330 |
| 7,794,358 B2 | * | 9/2010 | Parks | F16H 45/02 192/3.25 |
| 2002/0074200 A1 | * | 6/2002 | Back | F16H 45/02 192/3.29 |
| 2006/0185955 A1 | * | 8/2006 | Fukunaga | F16H 45/02 192/3.29 |
| 2007/0045076 A1 | * | 3/2007 | Brees | F16D 41/185 192/46 |
| 2008/0173510 A1 | * | 7/2008 | Saka | F16H 45/02 192/3.28 |
| 2009/0139818 A1 | * | 6/2009 | Ishikawa | F16H 45/02 192/3.29 |
| 2011/0132709 A1 | * | 6/2011 | Fukunaga | F16H 41/24 192/3.23 |
| 2012/0247901 A1 | * | 10/2012 | Kawahara | F16H 45/02 192/3.28 |
| 2016/0047469 A1 | * | 2/2016 | LaVoie | F16H 41/26 60/354 |

* cited by examiner

TORQUE CONVERTER HAVING A REACTOR CONTROLLED BY A JAW CLUTCH

FIELD OF INVENTION

This invention relates, primarily, to the class clutches and power-stop control and the sub-class of alternatively operative clutches. Also, this invention relates, secondarily, to the class of power plants and the sub-class of coaxial impeller and turbine unit.

BACKGROUND OF INVENTION

An automatic transmission is a gearbox that automatically changes gear ratios in response to vehicle and engine speed. Internal combustion engines work best at relatively high rotational velocities. An automatic transmission allows the internal combustion engine to be coupled to the wheels in a manner that allows a range of speed and torque outputs, while allowing the internal combustion engine to operate in its most efficient range.

One of the core challenges when automatic transmissions were first developed is what to do when the vehicle is at a stop (engine is moving, but wheels are not). Strictly mechanical solutions to attaching the engine to the transmission and the transmission to the wheels were attempted in the 1920s and 1930s. These solutions proved to be unduly complex and poorly functioning. As a result, automatic transmissions did not penetrate far into the car market.

The solution was found in fluid dynamics. A fluid coupling is a two element drive (impeller and turbine) that is incapable of multiplying torque. A torque converter has an additional element, called either a stator or reactor, that alters the fluid flow returning from the turbine to the impeller, allowing for a torque multiplication factor. This patent will use the term "reactor" for this element. In 1948, Buick introduced the Dynaflow transmission, which used the first mass-market torque converter.

Today, automatic transmissions rely on torque converters to transfer power from internal combustion engines to transmissions. Current worldwide estimates are that there will be 28.5 million automatic transmissions, using torque converters, produced in CY 2015, put in a total of 74.8 million light vehicles. Although less than 40% of the worldwide light vehicles use automatic transmissions with torque converters, in the U.S., the application rate is over 90%. There is a large market that is clearly not saturated, for both automatic transmissions and torque converters.

The Society of Automotive Engineers ("SAE") specification J641 defines several quantities for a hydrodynamic drive. Speed Ratio is the output speed divided by the input speed ($N_o/N_i$). Slip is the difference between the input speed ($N_i$) and the output speed ($N_o$). The torque ratio is the output torque divided by the input torque ($T_o/T_i$), also referred to as torque multiplication. The Capacity Factor, also called the K-Factor, is the input speed in rpm ($N_i$) divided by the square root of the input torque $T_i$. The K Factor varies with speed, meaning that there is a K Curve. The Coupling Range designates the range of operation at which the Torque Ratio is unity or near unity. The Coupling Point designates the point where the torque conversion range ends and the coupling range begins. A typical torque converter uses a hydraulic medium, an impeller, a turbine, and a reactor to transfer power from the engine to the transmission. The flywheel of the engine is mechanically connected to the torque converter cover, which in turn, is connected to the impeller assembly. The turbine is mechanically connected to the transmission via the input shaft. As the cover and impeller spin, the hydraulic fluid spins, causing the turbine to spin and drive the gearbox; the hydraulic fluid exiting the turbine flows into the reactor which in turn routes it back into the impeller. The reactor is mounted on the one-way clutch. A one-way clutch is a type of clutch that engages in one rotational direction, preventing reactor rotation, and freewheels (i.e., spins freely) in the other rotational direction, allowing reactor rotation.

In a typical torque converter, the output torque given to the input shaft is the sum of the input torque imparted by the impeller and a torque given by the reactor to the fluid. At lower Speed Ratios, the one-way clutch is engaged, and the reactor is lock-up (non-rotatable). When the Speed Ratio is relatively small and the torque converter fluid largely changes flowing direction, the reactor torque is positive, meaning that the output torque becomes larger than the input torque. As speed ratio increases, the torque on the reactor declines proportionally with declining torque ratio. When the Speed Ratio is at or above the Coupling Point, typically 0.8-0.85, the torque on the reactor reaches zero, the torque ratio becomes unity, and the one-way clutch disengages, allowing the reactor to free spin in the same direction as the turbine and impeller. If the brake of the vehicle is applied, the turbine is locked or restrained, allowing the wheels to come to a stop while the engine still rotates. This is the idling phase or mode. The idling phase lasts while the vehicle is at rest and, briefly, while acceleration starts. The stall phase has maximum torque multiplication. During the vehicle launch, the turbine is increasing in rotational velocity, but has a much lower magnitude than the impeller and its torque is higher than the impeller's torque. The torque converter connects an engine to the gearbox and multiplies engine torque for increased low-speed acceleration. In the current art, the reactor is non-rotatable during the stall and launch phase, and held non-rotatable by a one-way clutch.

In the current art of torque converters, a bypass clutch is used to mechanically connect, or gang, the turbine to the impeller as the velocity of the turbine approaches that of the impeller. A bypass clutch improves the efficiency of the torque converter. The bypass clutch may be either a slipping or a non-slipping clutch. To improve fuel economy, many current automatic transmissions will lock-up the torque converter with the bypass clutch significantly before the coupling point.

A lower K Factor means less slip. A higher K Factor means more slip. When the reactor blades spin freely, or when there is no reactor, the K Factor can be, typically, lower than when the reactor is non-rotating below the coupling point. During vehicle travel, the bypass clutch disengages and re-engages during several types of events. For example sudden throttle changes can cause the bypass clutch to disengage and re-engage. Additionally, the bypass clutch must typically disengage to enable gear changes during shifting. The bypass clutch re-engages after the shifting event. In these disengage and re-engage events, a lower K factor converter will slip less, consuming less fuel and causing less vehicle disturbance. During engine idling, a higher K Factor is desirable, for less engine load and less fuel consumption. Control of reactor rotation (or non-rotation) is important for shift quality and fuel economy, at idling, during launch and travel, and while shifting. A one-way clutch does not optimize the reactor rotation. As a result, unnecessary design trade-offs are made with respect to K-Factor, torque multiplication, shift quality, and fuel consumption.

REVIEW OF THE PRIOR ART

Unlike automatic transmissions, the prior art for torque converters has been stagnant, only slowly and incrementally advancing. The current prior art teaches, roughly, the device disclosed, above. A number of criticisms exist for the prior art of torque converters. Generally speaking, they are not shift-optimized, they require painful trade-offs between efficiency and performance, they are relatively large, they are relatively costly, and they are relatively complex. One of the easiest ways to improve a torque converter would be to find a suitable replacement to the reactor/stator one-way clutch. The reactor/stator one-way clutch is overly complex, and relatively costly.

Patents on automatic transmissions date from the 1920's. U.S. Utility Pat. No. 1,613,535, by named inventor Munro, issued Jan. 4, 1927, is entitled Power transmission gear ("Munro '535"). Munro '535 is a pneumatic automatic transmission, relying on compressed air to change gears. U.S. Utility Pat. Nos. 1,475,265; 1,502,953; and 1,539,188, by named inventor Hoffman, ("Hoffman patents") issued between 1923 and 1925, also related to automatic transmissions. The Hoffman patents disclosed and improved upon a design which selectively engaged and disengaged the drive of differential shaft, depending on the rotational velocity of the shaft.

Once the automatic transmission was invented, it took over seven (7) years for the first torque converter to be patented. U.S. Utility Pat. No. 1,754,893 by named inventor Hurlburt, filed Mar. 12, 1928 and issued Apr. 15, 1930, is entitled, "Torque converter" ("Hurlburt '893"). Hurlburt uses gears to perform the torque converter function, and not a fluid. U.S. Utility Pat. No. 1,855,967, by named inventor Jandasek, filed Sep. 8, 1928 and issued Apr. 26, 1932, is entitled, "Power transmission," ("Jandasek '967"). Jandasek '967, although entitled, "Power transmission," actually has some of the elements of torque converter. Jandasek '967 has an impeller and turbine. Additionally, it has a method for removing the energy from the fluid returning to the impeller; however, Jandasek '967 does not have a stator interposed between the impeller and turbine. Jandasek '967 is also not a torus. U.S. Utility Pat. No. 1,877,796, by named inventor Bossart, filed Jan. 27, 1932 and issued Sep. 20, 1932, is entitled, "Hydraulic torque converter" ("Bossart '796"). Bossart '796 used pistons and fluid in order to perform the torque converter function, and not a torus. U.S. Utility Pat. No. 1,993,741, by named inventor Jandasek, filed Jan. 5, 1931 and issued Mar. 12, 1935, is entitled, "Fluid torque converter" ("Jandasek '741").

Jandasek '741 was the first thoroughly modern torque converter. Jandasek '741 claims that it is an improvement over Jandasek '967. Jandasek '741 has an impeller, turbine, and guide sealed in a fluid-filled torus. The guide disclosed in Jandasek '741 is the first stator. It is fixed when the torque converter accelerates. It freewheels when the impeller and turbine are coupled. It has adjustable vanes. The stator and its one-way clutch have remained largely unchanged for the more than 80 years since Jandasek '741.

In the last 80 years, there have been improvements to the torque converter lock-up clutch. For example, U.S. Pat. No. 7,357,233, entitled, "Torque converter with a lock-up clutch assembly having a floating friction disk," teaches a lock-up clutch with a floating friction disc. U.S. Pat. No. 6,247,568, entitled, "Friction member for disk assembly, especially for torque converter," teaches a friction surface for a lock-up clutch. U.S. Patent Application Publication Number 20120247901, entitled, "Torque converter," teaches a novel side torsion spring for a lock-up clutch. U.S. Patent Application Publication Number 20090139818, entitled, "Torque converter," teaches a novel use of two pistons to allow slippage in the lock-up clutch.

There have been improvements to the bypass clutch. For example, U.S. Pat. No. 5,474,506, entitled, "Electronically controlled bypass clutch using target slips based on percent shift completion for a torque converter transmission," teaches an electronic control of a slipping bypass clutch. U.S. Pat. No. 6,742,638, entitled, "Hydraulic torque converter," teaches a bypass clutch with improved friction plates, which generates less heat. U.S. Pat. No. 5,975,260, entitled, "Hydrokinetic torque convertor with bypass clutch having grooved friction lining," teaches a new friction groove for the bypass clutch friction surface. U.S. Pat. No. 4,969,543, entitled, "Slipping bypass clutch construction for a hydrokinetic torque converter," teaches a slipping bypass clutch.

There have been improvements to the shape of the torus of the torque converter. U.S. Patent Application Publication Number 20060185955, entitled, "Torque converter," teaches a reduction in the axial size of torque converter with a new design and alignment of the torus. U.S. Pat. No. 7,454,902, entitled, "Torque converter," teaches a novel torus geometry. U.S. Pat. No. 7,401,688, entitled, "Torque converter," teaches a novel torus geometry. U.S. Pat. No. 6,959,544, entitled, "Torque converter," teaches a novel torus geometry.

The USPTO patent database includes over 1300 patents related, primarily, to torque converters since 1930. Out of these, a very small number relate to one-way clutch design. U.S. Pat. No. 7,866,454 (U.S. Patent Application Publication Number 20080173510), entitled, "Torque converter," teaches a stator that has a cylindrical piston on its periphery that can engage with the one-way clutch. U.S. Pat. No. 5,852,932, entitled, "One-way clutch mechanism of a torque converter," discloses a one-way clutch designed to reduce disengagement during shock, by placing a third member between the inner and outer race of the one-way clutch. U.S. Pat. No. 5,586,434, entitled, "One way clutch mechanism for a torque converter," teaches a one-way clutch with a roller ball and spring design. This is a non-exhaustive list, as there are additional one-way clutch designs that are either unremarkable given the current state of the art, or are intended for use in the transmission, proper, and not the torque converter.

A small number of patents teach torque converters with a fixed stator and no one-way clutch. U.S. Pat. No. 7,794,358, entitled, "Torque converter with fixed stator and method of controlling rotation of a turbine and pump in a torque converter," discloses a torque converter in which the stator one-way clutch has been removed and the stator has been fixed. U.S. Pat. Nos. 5,509,520; 5,613,581; 5,947,242; and 6,019,202 all teach a torque converter with a fixed stator; however, these patents are all for heavy duty machinery (all are assigned to Caterpillar).

A very small number of prior art patents and patent applications are concerned with replacing the one-way clutch, on a stator that can freewheel with the impeller during coupling. U.S. Patent Application Publication Number 20110132709, entitled, "Torque converter," by named inventor Fukunaga, discloses a torque converter in which a disc-type brake replaces the stator one-way clutch ("Fukunaga '709"). Although Fukunaga '709 replaces the one-way clutch with a disc-brake, this is hardly an optimal solution. In Fukunaga '709, the disc brake, when engaged, stops stator rotation. The brake includes a brake case coupled to the stator, a brake fixation member coupled to a stationary stator shaft, and a disc brake unit. Fukunaga '709 states that the torus inner and outer diameter ratio must be greater than or equal to 0.55, which is much greater than most modern torque converters. As a result, Fukunaga '709 would reduce the available torus area, significantly, negatively affecting the torque converter performance. Additionally, Fukunaga '709 uses more components and is likely heavier and more expensive than a traditional one-way clutch.

Japan Laid-Open Patent Publication Number 2006-300099, App. No. 2005-118490, by named inventor Fukumasu ("Fukumasu '099"), entitled, "Fluid transmission device with lock-up clutch," teaches a stator clutch or brake (it apparently uses the terms interchangeably). Fukumasu '099 teaches that the stator clutch/brake is engaged with a piston. Fukumasu '099 teaches a piston that has fluid pressure on two-side, plus a return spring. Fukumasu '099 teaches that the piston force on the stator clutch/brake can vary, continuously, depending the fluid pressure of the chamber. Fukumasu '099 has many of the same drawbacks as Fukunaga '709. In addition, Fukumasu '099 maintains the impeller and turbine gap by the friction plates. The gap will decrease over the time due to wear of the plates and cause the torque converter K factor and torque ratio changes, which will negatively affect the automatic transmission performance.

There are also examples of eliminating one-way clutches in transmissions. See, for example, U.S. Pat. No. 5,674,153, entitled, "Eliminating one-way clutches in transmission through use of hydraulic control system," which teaches the elimination of one-way clutches in a transmission by controlling the hydraulic pressure within the transmission.

Torque converter design has remained largely unchanged for the last 80 years, and has shown only small incremental improvements. One particular area that is ripe for improvement is the engagement and disengagement of the reactor.

SUMMARY OF THE INVENTION

The present invention improves and expands on the prior art, by replacing the reactor one-way clutch found in most torque converters with a jaw clutch, also called a dog clutch.

The present invention has an impeller assembly, a turbine assembly, and a reactor contained inside a torus filled with automatic transmission fluid ("ATF"). The impeller assembly is attached to a prime mover, such as an internal combustion engine. The turbine assembly is attached to a load, such as a vehicle transmission. The impeller assembly rotates the ATF. The ATF rotates the turbine assembly.

The present invention has a reactor controlled by a jaw clutch. One-side of the jaw clutch is attached to the reactor blades and the other side is non-rotatable. The jaw clutch has a jaw-clutch piston. The jaw-clutch piston engages and disengages the jaw clutch. When the jaw clutch is engaged, the reactor blades are held non-rotatable. When the jaw clutch is disengaged, the reactor blades are free to rotate in the ATF.

The jaw clutch piston is spline engaged with a stationary clutch housing, to keep the jaw clutch piston from rotating. Male jaw clutch teeth are attached to the piston. Female jaw clutch teeth are attached to the reactor. Alternately, the female teeth can be attached to the piston and the male teeth can be attached to the reactor. When the jaw clutch is disengaged, the reactor can rotate freely. When the jaw clutch is engaged, the reactor is fixed, non-rotatable.

The inventor's currently contemplated preferred operating mode is a four element torque converter in which a jaw-clutch shares a hydraulic circuit with a bypass clutch. When the bypass clutch is wide-open, or fully disengaged, the jaw clutch is engaged, preventing the reactor blades from rotating. When the bypass clutch is slipping or modulating, the jaw clutch disengages, and the reactor blades rotate. When the bypass clutch is fully engaged, or locked-up, the jaw clutch is disengaged, and the reactor blades rotate.

In the current prior art torque converter, reactor blade cross section geometries are often of airfoil shape, to optimize torque converter coupling point behavior. After idling and vehicle launch and during gear changes, the present invention allows the reactor to free spin during bypass disengage and re-engage. With such a design, combined with locking up the bypass clutch significantly before the coupling point for better fuel economy mentioned above, the coupling point may no longer be critical, allowing the reactor to be fabricated using a relatively inexpensive sheet-metal stamping process, rather than a relatively expensive casting process.

BRIEF DESCRIPTION OF THE DRAWINGS

The present invention is illustrated with two drawings.

DETAILED DESCRIPTION

Figure 1:
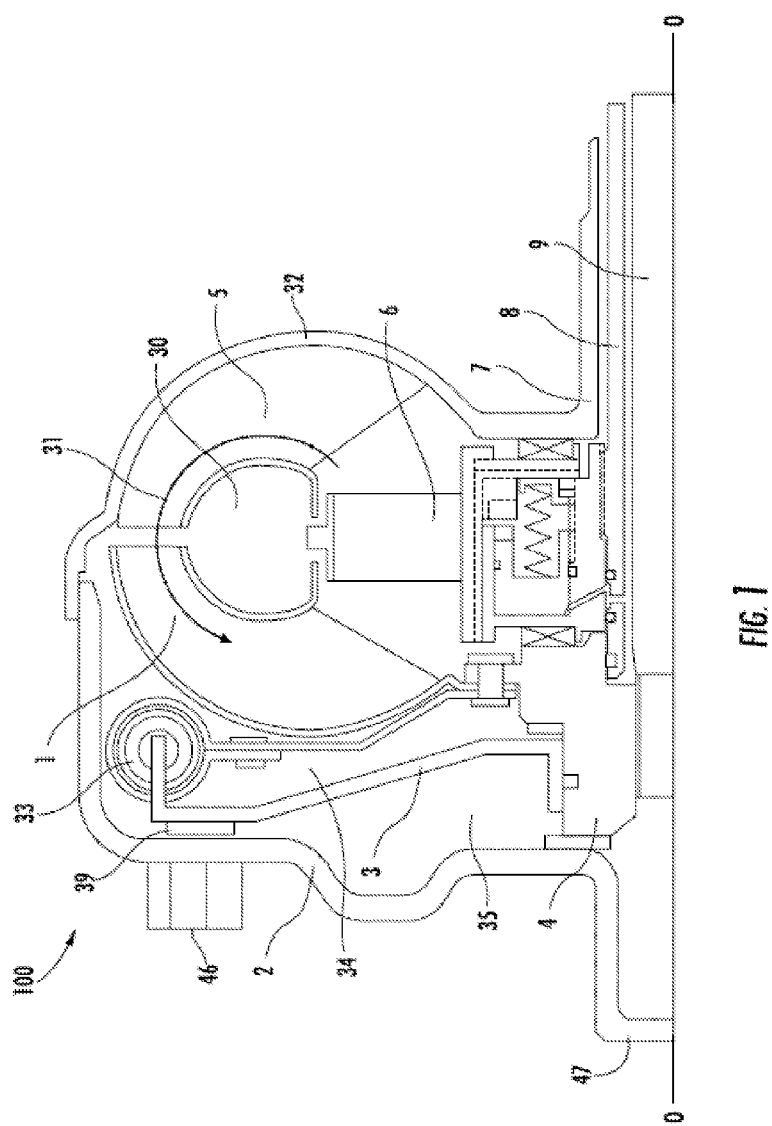
FIG. 1 is a cross-sectional view of a torque converter with reactor jaw clutch.

The following descriptions are not meant to limit the invention, but rather to add to the Summary of Invention, and illustrate the general design and implementation of a reactor jaw clutch in a torque converter. FIG. 1 shows a cross-sectional view of the present-invention torque converter 100. The torque converter 100 contains cover assembly 2 and a torus chamber 30, a turbine assembly 1, an impeller assembly 5, and a reactor 6. The torque converter 100 is filled with hydraulic fluid 31. The torque converter 100 has a bypass clutch 3 to lock the turbine assembly 1 to the cover 2.

The torque converter 100 rotates around an axis 0-0. The engine flywheel (not shown) is bolted to the nuts 46 on the cover. The turbine assembly 1 is connected to the input shaft 9 of the transmission. The cover 2 drives the impeller assembly 5, which resides in a torus chamber 30 filled with hydraulic fluid 31. An impeller shell 32 seals the torus chamber 30, and is connected to the cover 2 and the impeller hub 7. The rotation of the impeller assembly 5 rotates the hydraulic fluid 31. The hydraulic fluid 31, in turn, rotates the turbine assembly 1. The turbine assembly 1 rotates with the turbine hub 4. The reactor 6 is mounted on the stator support 8, which is non-rotatable. When the reactor 6 is non-rotatable, the reactor 6 redirects the flow of hydraulic fluid 31 from the turbine assembly 1 to the impeller assembly 5. The torque converter 100 is centered on the crankshaft (not shown) with the pilot 47.

The bypass clutch 3 has a bypass clutch piston 3 and a friction surface 39. The friction surface 39 is attached to the bypass clutch piston 3 and opposes the inner surface of the cover 2. An outer fluid chamber 35 is defined by the bypass clutch piston 3, the inner surface of the cover 2, the friction surface 39, and the turbine hub 4. An inner fluid chamber 34 is defined by the inner surface of the bypass clutch piston 3, the damper 33, and the turbine hub 4. When the fluid pressure in the inner fluid chamber 34 is greater than the fluid pressure in the outer fluid chamber 35, the bypass clutch piston 3 will lock the friction surface 39 to the inner surface of the cover 2, and the bypass clutch is fully engaged. When the pressure in the inner chamber 34 is approximately equal to or slightly greater than the pressure in the outer chamber 35, the bypass clutch will slip. When the pressure in the inner chamber 34 is less than the pressure in the outer chamber 35, the bypass clutch will be open.

Figure 2:
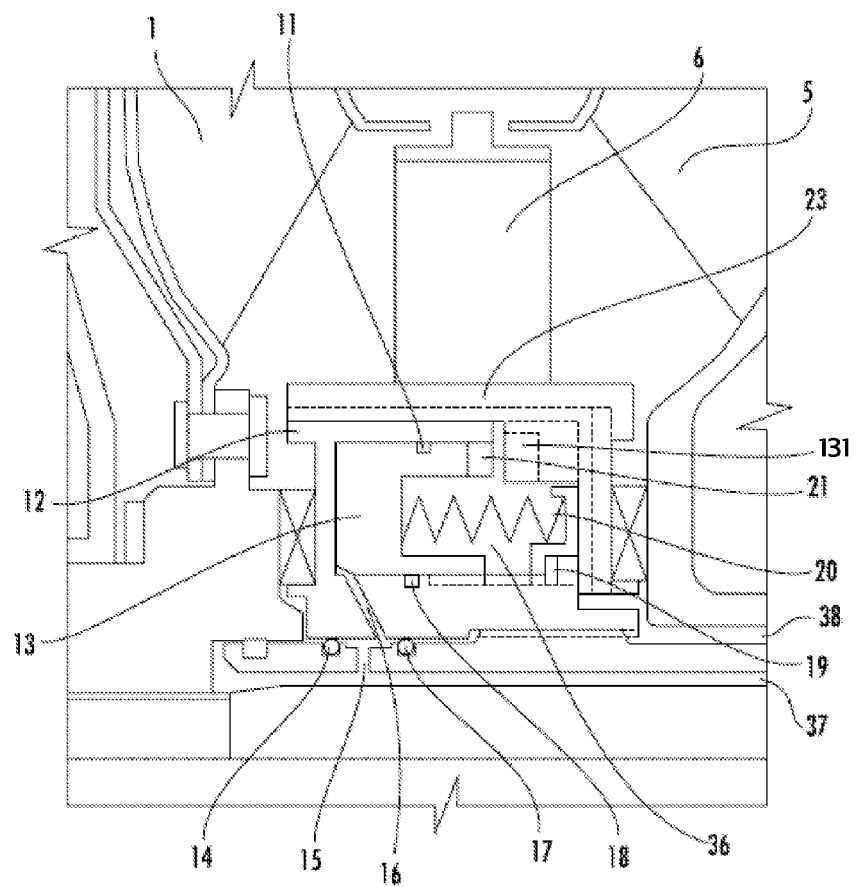
FIG. 2 is a close-up cross-sectional view of reactor jaw clutch.

FIG. 2 shows a close-up of the jaw clutch. It shows the impeller assembly 5, turbine assembly 1, and reactor 6. The jaw clutch is comprised of a jaw clutch housing 12; a jaw clutch piston 13; male jaw clutch teeth 21; female jaw clutch teeth 131; a spring assembly 20; a jaw clutch piston fluid path 15, 16; a plurality of seal glands 11, 18; a plurality of seals 14, 17 (seals associated with seal glands 11, 18 are not shown); and a clip 19. There is a turbine and reactor fluid path 23. The jaw clutch housing 12 is connected to the stator support 8, and non-rotatable. The jaw clutch piston 13 is spline engaged with the jaw clutch housing 12, so that the jaw clutch piston 13 cannot rotate. The jaw clutch piston is attached to the male jaw clutch teeth 21. The female jaw clutch teeth 131 are attached to the reactor.

At stall, the bypass clutch is disengaged. The path 37 is the fluid charge path, and the path 38 is the fluid discharge path. The cover 2 and impeller 5 are moving at engine speed and the turbine assembly 1 is non-rotatable. The reactor 6 is non-rotatable, locked-up by the jaw clutch teeth 21, 131. The jaw clutch teeth are forced together by the jaw clutch piston 13. The jaw clutch piston 13 is engaged by fluid pressure supplied through the fluid paths 15, 16, 37, originating from the path 37 between the stator support 8 and input shaft 9. The spring assembly fluid chamber 36 is fed by a fluid path 38 between the stator support 8 and the impeller hub 7.

At vehicle launch, the bypass clutch is disengaged until it reaches to the speed ratio where the bypass clutch can be engaged. When the bypass clutch is disengaged, the fluid charge path 37 and the fluid discharge path 38 remain the same. When the bypass clutch is slipping or engaged, the path 38 is the fluid charge path and the path 37 is the fluid discharge path, because the fluid reverses direction. When the bypass clutch is disengaged, the cover 2 and impeller assembly 5 are moving at engine speed; the impeller assembly 5 accelerates the rotation in the hydraulic fluid 31; the rotation of the hydraulic fluid 31 accelerates the turbine assembly 1; the reactor 6 is non-rotatable, locked-up by the jaw clutch teeth 21, 131; the jaw clutch teeth 21, 131 are forced together by the jaw clutch piston 13; the jaw clutch piston 13 is engaged by fluid pressure supplied by the fluid paths 15, 16.

During traveling, the bypass clutch 3 engages, mechanically coupling the turbine assembly 1 to the impeller assembly 5. When the bypass clutch engages, the fluid pressure supplied to the jaw clutch by the fluid paths 15, 16 lowers, and the jaw clutch spring assembly 20 forces the jaw clutch piston 13 to retract, and the jaw clutch teeth 21, 131 to separate. This allows the reactor 6 to freely spin. The bypass clutch 3 outer fluid chamber 35 shares a fluid path 16 with the jaw clutch. When the pressure in the bypass clutch outer fluid chamber 35 is greater than the pressure in the bypass clutch inner fluid chamber 34, the pressure fed through the fluid path 16 will force the jaw clutch piston 13 to compress the jaw clutch spring assembly 20. This engages the jaw clutch, and prevents the reactor 6 from rotating. When the pressure in the bypass clutch outer fluid chamber 35 is approximately equal to or slightly less than the pressure in the bypass clutch inner fluid chamber 34, the bypass clutch 3 slips. Also, the jaw-clutch disengages, because the fluid pressure in the spring assembly fluid chamber 36 is approximately equal to the fluid pressure in the path 16 and behind the jaw clutch piston 13. In this case, the spring assembly 20 disengages the jaw clutch. Likewise, when the pressure in the bypass clutch outer fluid chamber 35 is less than the pressure in the bypass clutch inner fluid chamber 34, the jaw clutch will be disengaged. In this way, the bypass clutch and jaw clutch interact, sharing a hydraulic circuit.

Overall, jaw clutch engagement and disengagement can be tailored to the needs of the vehicle and transmission by controlling the return force of the spring assembly 20, adjusting the relationship between the engagement and disengagement of the bypass clutch, on the one hand, and the disengagement and engagement of the jaw clutch, on the other hand.

I claim:

1. A four element torque converter comprising: an impeller assembly, a turbine assembly, a reactor, and a slipping bypass clutch, wherein the slipping bypass clutch can be fully locked; fully unlocked; or slipping wherein the rotation of the reactor is controlled by a jaw clutch, said jaw clutch being comprised of a jaw-clutch piston, jaw-clutch teeth attached to the jaw-clutch piston, jaw-clutch teeth attached to a rotatable portion of the reactor, and a hydraulic circuit to engage and disengage the jaw clutch;

wherein the bypass clutch and the jaw clutch share at least one of a hydraulic fluid circuit and a hydraulic fluid chamber.

2. The four element torque converter in claim 1, wherein the jaw clutch engages to fix the reactor in a non-rotatable state; and wherein the jaw clutch disengages, allowing the reactor to freely spin.

3. The four element torque converter in claim 2, wherein, fully engaging, or locking, the bypass clutch causes the jaw clutch to disengage, allowing the reactor to rotate; fully disengaging the bypass clutch causes the jaw clutch to engage, fixing the reactor; and allowing the bypass clutch to slip or modulate causes the jaw clutch to disengage, allowing the reactor to rotate.

4. The four element torque converter in claim 1, wherein the reactor is stamped out of sheet metal.

5. The four element torque converter in claim 1, wherein the reactor can be integrally stamped from sheet metal.

* * * * *